United States Patent [19]

Redmond et al.

[11] Patent Number: 5,664,862

[45] Date of Patent: Sep. 9, 1997

[54] EDGE LIGHT FOR PANEL DISPLAY

[75] Inventors: William Franklin Redmond, Santa Rosa; Richard Edward Dunah, Sebastopol; Yong Qiao, Santa Rosa, all of Calif.

[73] Assignee: Precision Lamp, Inc., Cotati, Calif.

[21] Appl. No.: 694,833

[22] Filed: Aug. 9, 1996

Related U.S. Application Data

[63] Continuation of Ser. No. 347,620, Nov. 29, 1994, abandoned.

[51] Int. Cl.[6] .................................................. F21V 7/04
[52] U.S. Cl. .................. 362/31; 362/32; 362/293; 385/31; 385/88; 385/901
[58] Field of Search ........................... 362/31, 32, 293, 362/255, 369, 390, 800; 385/31, 88, 901

[56] References Cited

U.S. PATENT DOCUMENTS

| | | |
|---|---|---|
| 2,646,637 | 7/1953 | Nierenberg et al. . |
| 3,692,383 | 9/1972 | Herod et al. ............................ 362/293 |
| 3,968,584 | 7/1976 | Kingston ................................. 362/31 |
| 4,011,001 | 3/1977 | Moriya . |
| 4,257,084 | 3/1981 | Reynolds . |
| 4,260,220 | 4/1981 | Whitehead . |
| 4,277,817 | 7/1981 | Hehr . |
| 4,323,951 | 4/1982 | Pasco . |
| 4,528,617 | 7/1985 | Blackington . |
| 4,659,183 | 4/1987 | Suzawa . |
| 4,706,173 | 11/1987 | Hamada et al. . |
| 4,733,332 | 3/1988 | Yamashita et al. . |
| 4,791,540 | 12/1988 | Dreyer, Jr. et al. . |
| 4,799,137 | 1/1989 | Aho . |
| 4,883,333 | 11/1989 | Yanez . |
| 4,890,201 | 12/1989 | Toft ......................................... 362/31 |
| 4,909,604 | 3/1990 | Kobayashi et al. . |
| 4,984,144 | 1/1991 | Cobb et al. . |
| 5,005,108 | 4/1991 | Pristash et al. . |
| 5,027,258 | 6/1991 | Schöniger et al. ...................... 362/31 |
| 5,036,435 | 7/1991 | Tokuda et al. . |
| 5,046,826 | 9/1991 | Iwamoto et al. . |
| 5,050,946 | 9/1991 | Hathaway et al. . |
| 5,070,431 | 12/1991 | Kitazawa et al. . |
| 5,079,675 | 1/1992 | Nakayama . |
| 5,093,765 | 3/1992 | Kashima et al. . |
| 5,126,882 | 6/1992 | Oe et al. . |
| 5,128,842 | 7/1992 | Kenmochi . |
| 5,134,549 | 7/1992 | Yokoyama . |
| 5,227,773 | 7/1993 | Wu et al. . |
| 5,233,679 | 8/1993 | Oyama ................................... 385/901 |
| 5,375,043 | 12/1994 | Tokunaga .............................. 362/31 |
| 5,485,291 | 1/1996 | Qiao et al. ............................. 362/31 |

FOREIGN PATENT DOCUMENTS

| | | |
|---|---|---|
| 3825-436 A | 3/1989 | Germany . |
| 465376 | 8/1951 | Italy . |
| 62-73206 | 4/1987 | Japan . |
| 63-287303 | 11/1988 | Japan . |
| 63-271301 | 11/1988 | Japan . |

*Primary Examiner*—Ira S. Lazarus
*Assistant Examiner*—Sara Sachie Raab
*Attorney, Agent, or Firm*—Flehr, Hohbach, Test, Albritton and Herbert LLP

[57] ABSTRACT

An edge light for projecting light into a lighting panel through an end surface of the lighting panel. The edge light includes a thin transparent optical guide member having an elongate portion and at least one end portion extending from the elongate portion. The elongate portion has a planar surface and a shaped surface generally parallel to the planar surface and configured for reflecting light within the guide member through one of the planar surface and the shaped surface. Either the planar surface or the shaped surface is positioned adjacent the end surface of the lighting panel when the edge light is used to illuminate the panel. The edge light also includes a light source positioned at the end portion for projecting light into the elongate portion of the optical guide member.

26 Claims, 5 Drawing Sheets

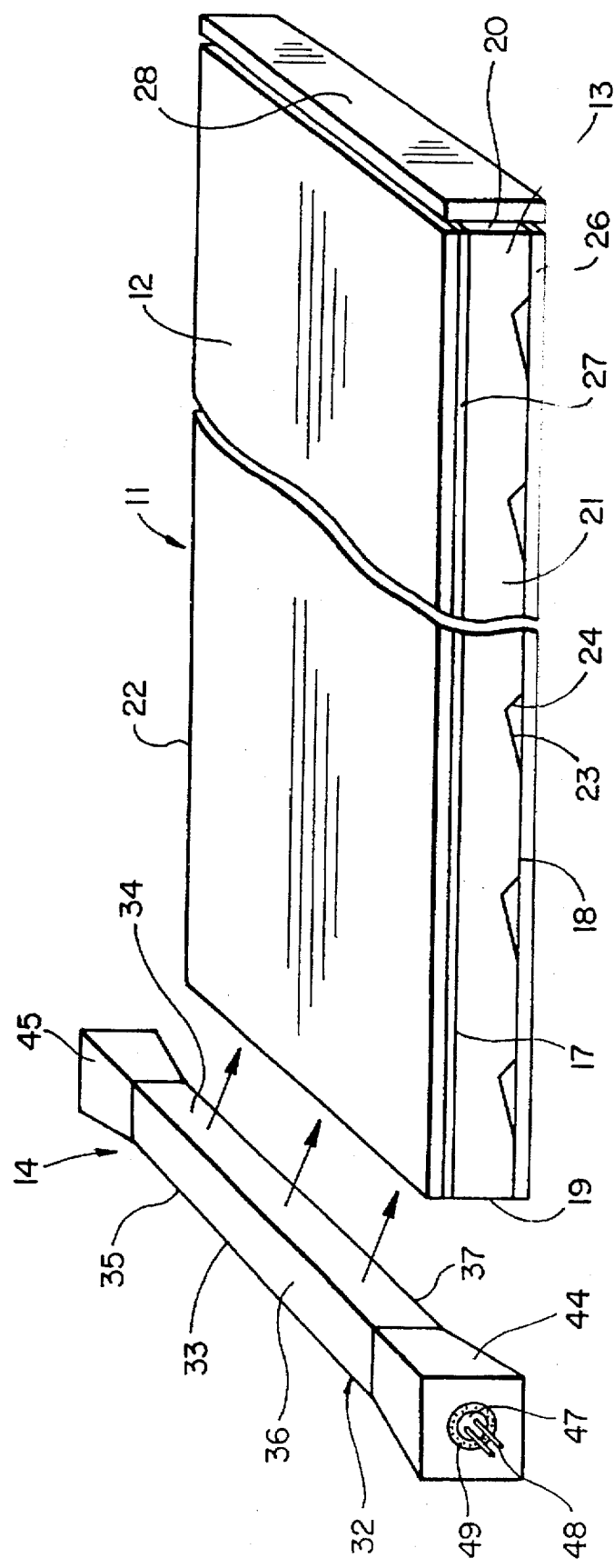
FIG_1

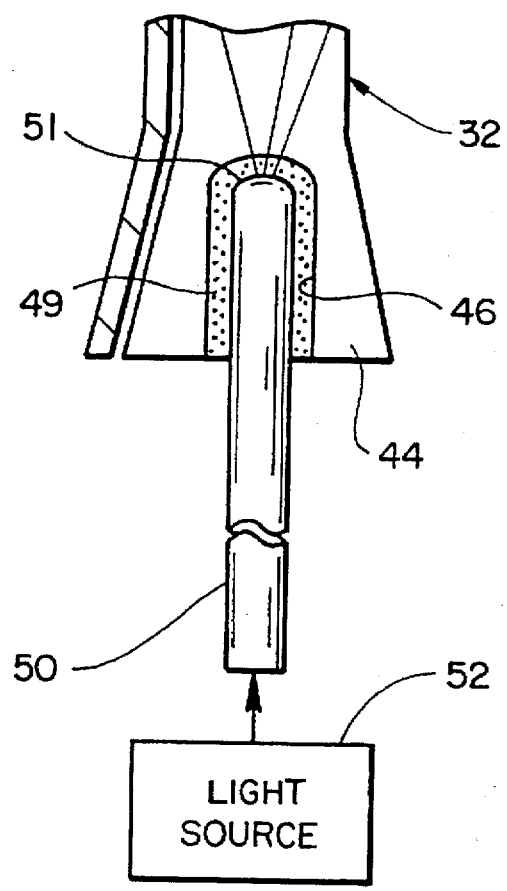
FIG_1A
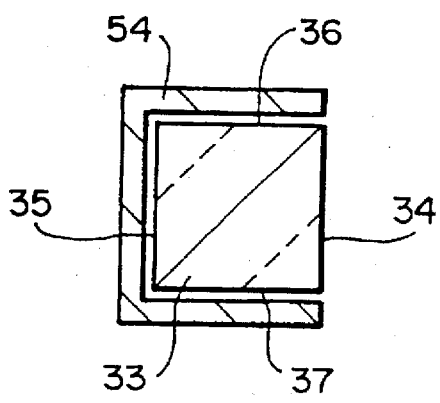
FIG_4
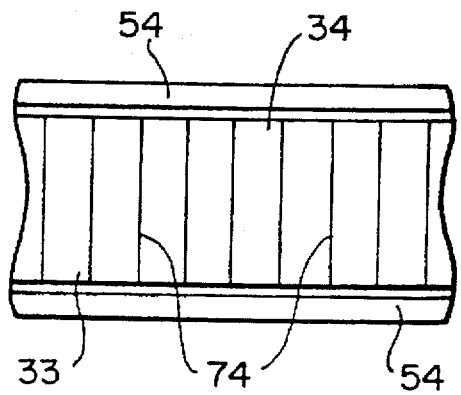
FIG_8

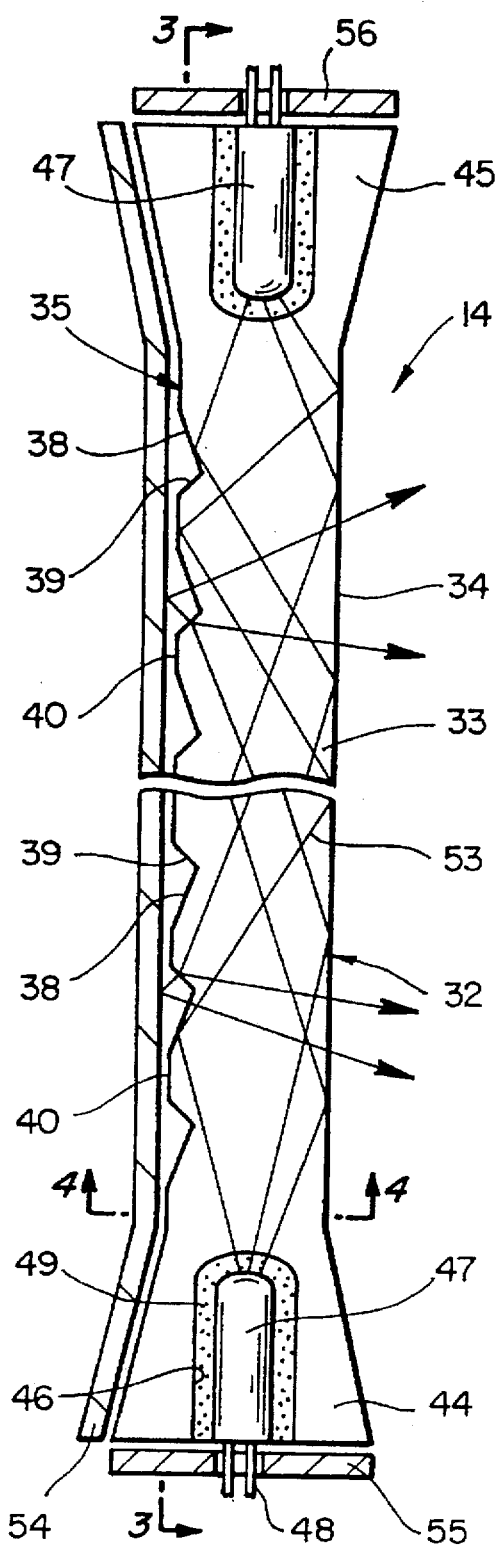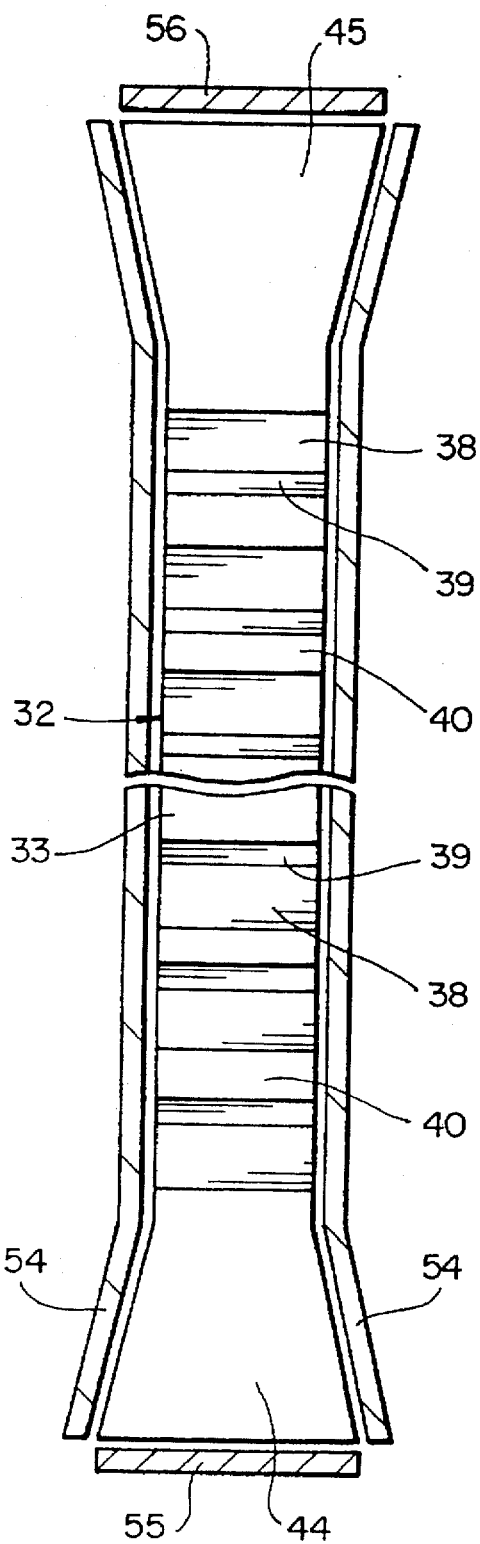
FIG_2   FIG_3

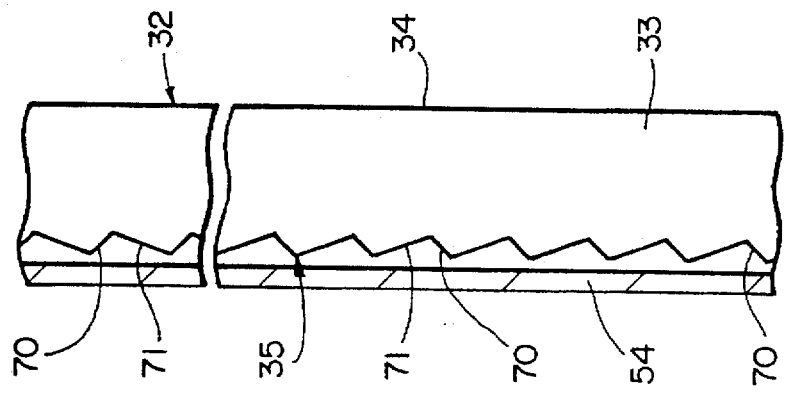
FIG_7
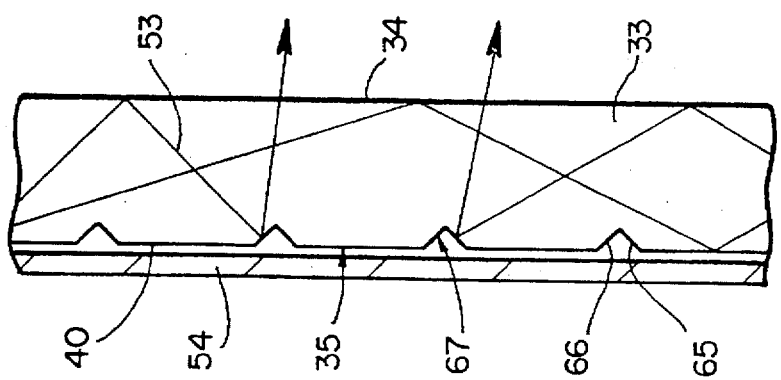
FIG_6
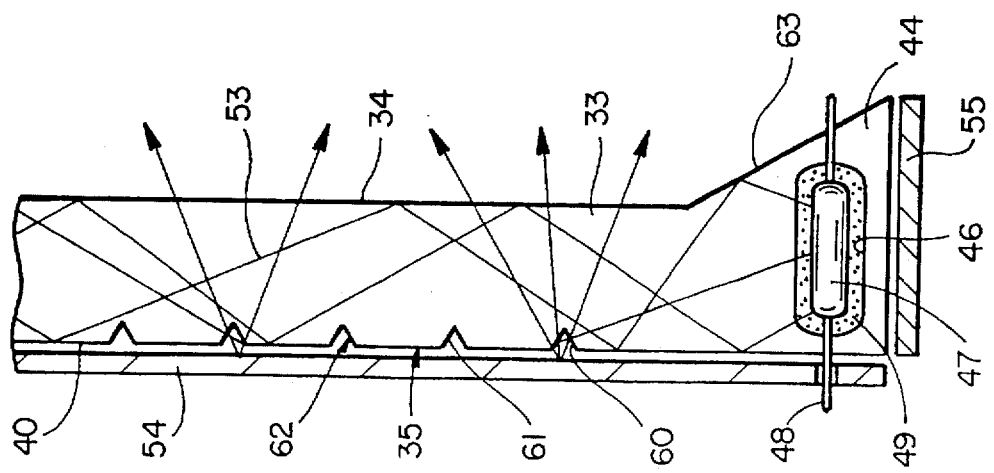
FIG_5

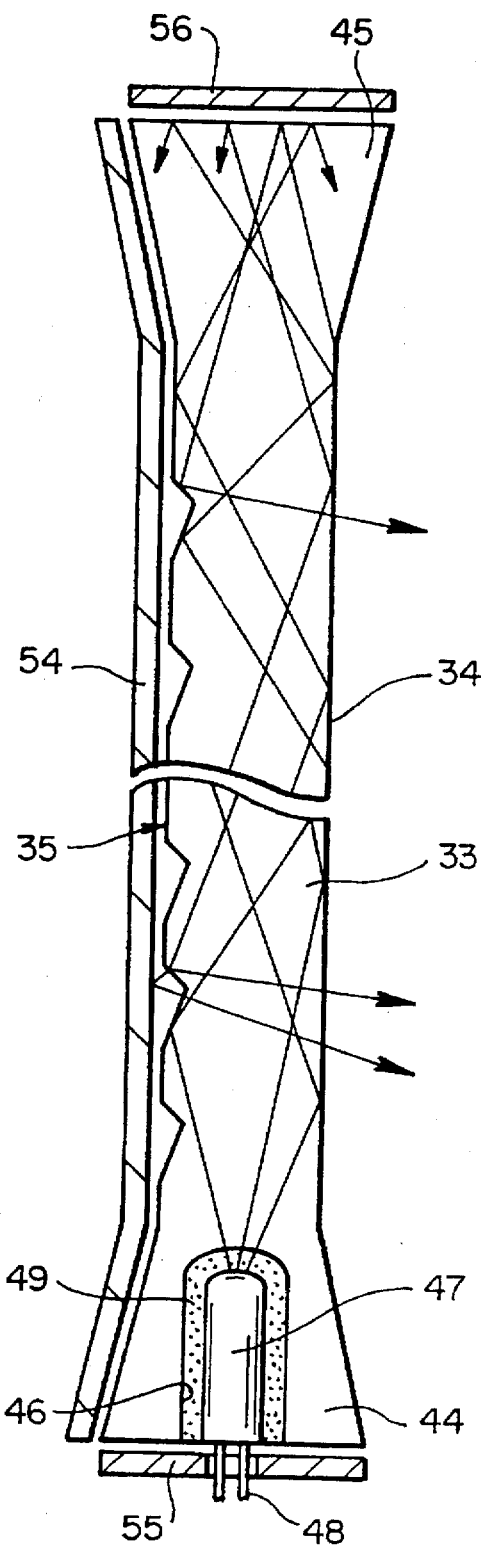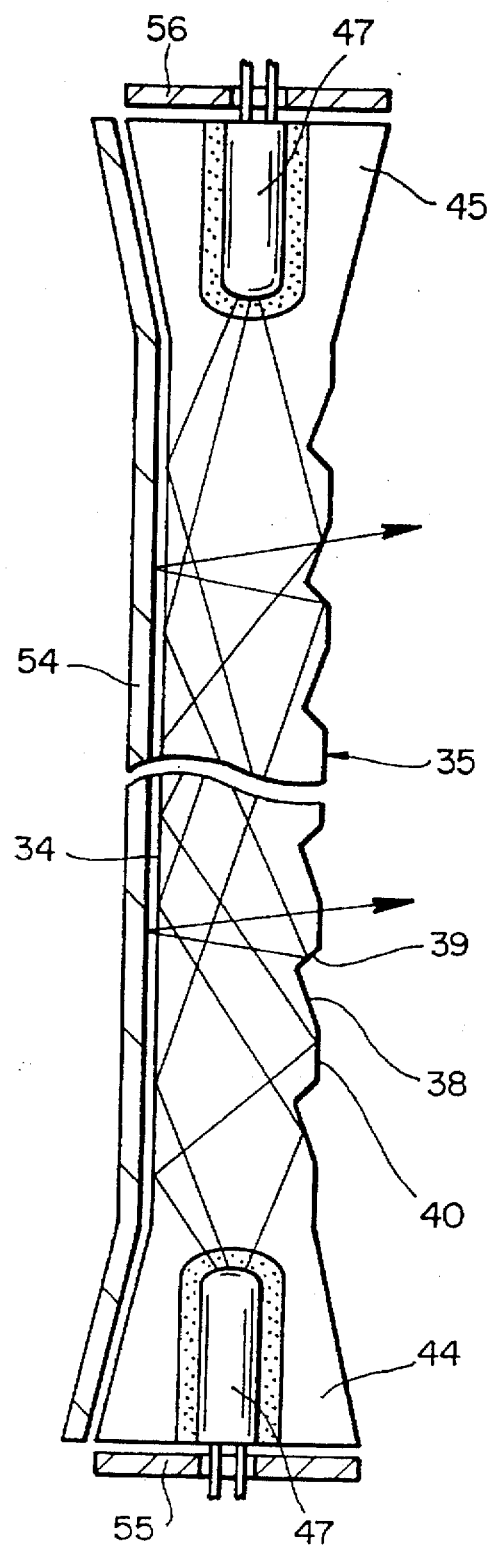
FIG_9    FIG_10

EDGE LIGHT FOR PANEL DISPLAY

This is a continuation of application Ser. No. 08/347,620 filed Nov. 29, 1994 now abandoned.

BRIEF DESCRIPTION OF THE INVENTION

This invention relates generally to a light source for illuminating a panel display and, more particularly, to an edge light for illuminating a lighting panel.

BACKGROUND OF THE INVENTION

Large area light sources have many applications including, for example, backlighting liquid crystal displays (LCDs) for watches, clocks, pagers, hand-held computers, organizers and the like. Such large area light sources typically employ a thin, flat lighting panel illuminated by one or more miniature lamps, light emitting diodes or the like positioned along at least one of the edges of the lighting panel. The light radiated by the lamps enters the edges of the lighting panel and is reflected through the panel and emitted from one of the planar surfaces of the panel for illuminating the LCD.

It is generally desirable to provide the LCD with a uniform distribution of light so that the entire surface of the LCD may be easily read in most ambient light conditions. Many available lighting panels are configured to maximize the uniform distribution of light emitted from the lighting panel. However, one limitation in achieving a uniform light distribution is that the light radiated by the light source (lamp) is not uniformly distributed along the edge of the lighting panel even when a reflector or the like is used to improve the light coupling efficiency of the lamp. The light radiated by the lamp typically has a bright spot or area of high light concentration. If several lamps are required, the lamps are separated by areas of shadow or low light intensity which may produce longitudinal-striations in the output of the lighting panel. Using several lamps to illuminate the lighting panel also increases the cost of the large area light source. Providing uniform lighting along the edge of the lighting panel would increase the uniform distribution of light emitted by the lighting panel.

OBJECTS AND SUMMARY OF THE INVENTION

It is an object of this invention to provide an edge light for illuminating a lighting panel.

It is another object of this invention to provide an edge light for uniformly illuminating the edge of a lighting panel.

It is another object of this invention to provide a large area light source employing a lighting panel and an edge light having a planar surface and a faceted surface for uniformly illuminating the edge of the lighting panel.

It is yet another object of this invention to provide an edge light minimizing the number of lamps, light-emitting diodes, or the like which are used to illuminate the lighting panel of a large area light source.

The foregoing and other objects of the invention are achieved by an edge light having a thin transparent optical guide for projecting light into the lighting panel through one of the ends of the panel. The optical guide has an elongate portion with a planar surface and a shaped surface and at least one end portion extending from the elongate portion. A light source positioned at the end portion of the optical guide projects light into the elongate portion of the optical guide. The shaped surface is configured to reflect light within the elongate portion through the planar surface or the shaped surface. In a preferred form of the invention, the planar surface is positioned adjacent the end of the lighting panel and the optical guide has two end portions each having a light source for illuminating the optical guide. The edge light also preferably includes one or more reflectors adjacent the surfaces of the optical guide for reflecting light back into the guide. In one form of the invention, the end portion is flared outward relative to the plane of the planar and shaped surfaces and the light source is supported in an opening formed in the end portion.

BRIEF DESCRIPTION OF THE DRAWINGS

The foregoing and other objects of the invention will be more readily apparent from the following detailed description and appended claims when taken in conjunction with the drawings of which:

FIG. 1 is a perspective view of an edge light and display assembly in accordance with one embodiment of the invention;

FIG. 1A is an enlarged cross-sectional view, partially broken away, of a modification of the edge light of FIG. 1;

FIG. 2 is an enlarged cross-sectional view of the edge light of FIG. 1;

FIG. 3 is a view taken along the line 3—3 of FIG. 2;

FIG. 4 is a view taken along the line 4—4 of FIG. 2;

FIG. 5 is an enlarged cross-sectional view, partially broken away, of an edge light in accordance with another embodiment of the invention;

FIG. 6 is an enlarged cross-sectional view, partially broken away, of an edge light in accordance with another embodiment of the invention;

FIG. 7 is an enlarged cross-sectional view, partially broken away, of an edge light in accordance with still another embodiment of the invention;

FIG. 8 is an enlarged front view, partially broken away, of an edge light in accordance with yet another embodiment of the invention; and FIGS. 9 and 10 are enlarged cross-sectional views of an edge light in accordance with other embodiments of the invention.

DETAILED DESCRIPTION OF THE INVENTION

Reference will now be made in detail to the preferred embodiment of the invention, which is illustrated in the accompanying figures. Turning now to the drawings, wherein like components are designated by like reference numbers throughout the various figures, attention is directed to FIGS. 1–4.

A display assembly 11 including an LCD 12, a lighting panel 13 and an edge light 14 incorporating the invention is shown in FIG. 1. In the illustrated embodiment, the uniformly thin lighting panel 13 has an upper planar major surface 17 and a lower shaped major surface 18 parallel to the planar surface 17. Parallel first and second end surfaces 19 and 20 and parallel side surfaces 21 and 22 join the planar major surface 17 and the shaped major surface 18. The planar major surface 17, end surfaces 19 and 20 and side surfaces 21 and 22 are preferably polished to a smooth optical finish. A thin, flat member 26 with a highly reflective light scattering surface is positioned below the shaped major surface 18 and a reflector 28 is positioned adjacent the second end surface 20 to reflect light back into the lighting panel 13. A diffuser 27 may be placed between the LCD 12 and lighting panel 13 to scatter the light emitted from the panel and illuminates the LCD. If a more intense light source is desired, a second edge light (not shown) may be positioned adjacent the end surface 20 instead of the reflector 28.

The shaped major surface 18 of the lighting panel 13 has a plurality of optically flat facets 23 and 24 which extend between the side surfaces 21 and 22 and are generally parallel to the front end surface 19. The inclination, spacing and depth of the facets 23 and 24 may vary as desired. Preferably, the facets 23 and 24 are shaped so that light entering the lighting panel through end surface 19 is reflected along the panel toward the end surface 20 by facets 23. Light reflected back into the lighting panel at end 20 strikes the facets 24 and is either specularly reflected upward through the planar major surface 17 or transmitted further along the lighting panel. In the illustrated embodiment, the facets 23 are inclined upwardly between 1° and 15° from the plane of the lower surface 18. The second facets 24 are inclined downwardly at a steep angle between 35° and 55° with respect to the plane of the shaped major surface 18, preferably between 40° and 50°. The grooves defined by the facets 23 and 24 are separated by planar sections having a width between 1 and 200 microns. However, facets 23 and 24 may have other configurations depending upon the desired uniformity and intensity of light emitted from the lighting panel 13.

The edge light 14 provides a uniform distribution of light for illuminating the lighting panel 13. As shown particularly in FIGS. 1 and 2, edge light 14 includes a transparent, optical guide 32 having an elongated portion 33 with a planar front surface 34 adjacent the end 19 of the lighting panel 13 and a shaped back surface 35 generally parallel to the planar front surface 34. The planar surface 34 preferably has a length and height substantially equivalent to the dimensions of the end surface 19 of the lighting panel 13. The planar and shaped surfaces 34 and 35 are joined by a top surface 36 and a bottom surface 37. The shaped surface 35 has a plurality of optically flat facets 38 and 39, FIG. 2, separated by polished planar portions 40. The optical guide 32 also includes first and second end portions 44 and 45 extending from the elongate portion 33.

The optical guide 32 is typically an injection molded light transmissive plastic member which, depending on the light source, can emit white light or can be tinted to any desired color for respective colored light emission. The planar surface 34, the top and bottom surfaces 36 and 37 and the surfaces of the end portions 44 and 45 are preferably polished to an optical finish.

In the present embodiment, the surfaces of the end portions 44 and 45 are flared outwardly relative to the planar and shaped surfaces 34 and 35 and the top and bottom surfaces 36 and 37 as shown in FIG. 1 to accommodate a light source. The end portions 44 and 45 are each formed with an opening 46 (FIG. 2) which holds an incandescent lamp 47 with the leads 48 projecting from the end portions 44 and 45 of the guide 32. The lamps 47 are coupled to the end portions 44 and 45 by a transparent, resilient light coupling material 49 which fills the opening 46 around the lamp 47. The material 49 provides shock and vibration protection, and preferably has an index of refraction for efficient transfer of light into the light guide 32. If desired, the material 49 may be tinted to provide colored illumination. Instead of the incandescent lamps 47, other light sources such as fluorescent lamps, light-emitting diodes, etc. may be used to illuminate the edge light 14. The light source may also be provided by an optical fiber 50 as shown in FIG. 1A. The optical fiber may be coupled to the guide 32 by inserting one end 51 of the fiber 50 into opening 46. A remote light source 52 injects light into the opposite end of the optical fiber. The optical fiber 50 transmits light from the remote light source 52 to the guide 32, emitting light through fiber end 51 into the end portion of the guide 32.

In the present embodiment, facets 38 face one of the lamps 47 as shown in FIG. 2. Facets 38 in the shaped surface 35 are inclined inwardly at an angle between 1° and 15° with respect to the plane of the shaped surface. The second facets 39 are inclined outwardly at a steep angle of between 35° and 55°, preferably 40° and 50°, with respect to the plane of the shaped surface. The depth of the grooves defined by the facets is between 1 and 25 microns, and the width of the planar portions 40 separating the grooves is between 1 and 200 microns. As is illustrated by light rays 53 in FIG. 2, light injected into the light guide 32 by lamps 47 is reflected along the elongate portion 33 by the planar surface 34, the facets 38 and planar portions 40 of the shaped surface 35, and the top and bottom surfaces 36 and 37. The facets 39 of the shaped surface 35 specularly reflect light through the planar surface 34 if the light strikes the facet 39 at an angle greater than or equal to the critical angle or, if the light strikes the facets 39 at an angle less than the critical angle, the facets 39 transmit light along the elongate portion 33. The light emitted from the planar surface 34 is projected into the lighting panel 13 and used to illuminate the display.

Any light escaping from the shaped surface 35 or the top and bottom surfaces 36 and 37 is reflected back into the elongate portion 33 of the guide 32 by a reflector 54 which covers the shaped surface and the top and bottom surfaces. In the present embodiment, the reflector 54 is provided by a reflector tape or other suitable material having a specular reflecting surface. Reflectors 55 and 56 reflect light emitted from the end portions 44 and 45 back into the light guide 32. The reflectors 54, 55 and 56 ensure that all of the light emitted from the optical guide 32 is directed toward the lighting panel 13, improving the efficiency of the edge light 14.

The shaped surface 35 is configured to provide a uniform distribution of light across the planar surface 34. The inclination and spacing of the facets may be uniform across the length of the shaped surface 35 as shown in FIG. 2 or the inclination and spacing of the facets may be varied as necessary to provide a uniform distribution of light across the planar surface 35. The inclination of the facets 38 provides multiple reflections of light within the elongate portion 33 which uniformly distribute the light throughout the optical guide 32. The multiple reflections prevent the light from being concentrated in the area of the optical guide opposite the lamp 47. Thus, a uniform distribution of light may be provided.

If desired, the shaped surface 35 may be formed with other configurations to provide a uniform distribution of light across the planar surface 34. In the embodiment shown in FIG. 5, shaped surface 35 has a plurality of facets 60 and 61 inclined at an angle of 45° to 67.5° relative to the plane of the shaped surface 35. The facets 60 and 61 define a plurality of transversely extending V-shaped grooves 62 having a depth of 1 to 25 microns. The grooves 62 are separated by a spacing of 1 to 250 microns.

As is demonstrated by light rays 53, light radiated from lamps 47 is reflected along the elongate portion 33 by the planar surface 34, the planar portions 40 of the shaped surface 35 and the top and bottom surfaces 36 and 37. The light striking one of the facets 60, 61 of groove 62 leaves the elongate portion 33, strikes the other facet of the groove 62 and is reflected outwardly toward the reflector 54. The reflector 54 specularly reflects the light back into the elongate portion 33 and through the planar surface 34. Any light escaping from the shaped surface 35 and top and bottom surfaces 36 and 37 is reflected back into the guide 32 and, in some instances, through the planar surface 34. The light emitted from the optical guide 32 is uniformly distributed across the planar surface 34.

In the embodiment shown in FIG. 5, the end portions 44 and 45 have a slanted surface 63 extending outwardly at an angle of 15° to 30° relative to the planar surface 34 of the elongate portion 33. The lamp source 47 is oriented with the longitudinal axis of the lamp 47 and the leads 48 extending in a direction perpendicular to the plane of the shaped surface 35. Light radiated from the lamp 47 is reflected along the optical guide 32 by the surfaces of the end portions 44 and 45.

Another embodiment of an edge light 14 is shown in FIG. 6. The elongate portion 33 has a shaped surface 35 formed with a plurality of facets 65 and 66. Preferably, the facets are inclined at an angle of 35° to 45° relative to the plane of the shaped surface 34. The grooves 67 defined by the facets 65 and 66 have a depth of 1 to 25 microns. The planar portions 40 separating the grooves 67 have a width of 1 to 250 microns, although it should be understood that the depth and spacing of the grooves 67 along the elongate portion 33 may be varied to achieve a uniform distribution of light across the planar surface 34. As shown by light rays 53, light radiated from the lamps 47 is reflected along the elongate portion 33 by the planar surface 34, planar portions of the shaped surface 35 and the top and bottom surfaces 36 and 37. Light striking the facets 65 and 66 is reflected through the planar surface of the elongate portion 33 and projected into the end surface 19 of the lighting panel 13.

FIG. 7 illustrates still another embodiment of the edge light 14. The shaped surface 35 of the elongate portion 33 has parallel facets 70 joined by parallel facets 71. The facets 70 are inclined at an angle of 35° to 45° relative to the plane of the shaped surface 35. The depth of the facets 70 is approximately 1 to 25 microns, while the spacing between the facets 70 is approximately 1 to 250 microns. The inclination of facets 71 will vary depending upon the depth and spacing of the facets 70. Light radiated by the lamp 47 is reflected along the elongate portion 33 by the planar surface 34 and the facets 71 of the shaped surface 35. Light striking the facets 70 is reflected through the planar surface 34 and projected into the end surface 19 of the lighting panel 13. Any light escaping from the shaped surface 35 or the top and bottom surfaces 36 and 37 is reflected back into the elongate portion 33 by the reflector 54. The light emitted from the optical guide 32 is uniformly distributed across the planar surface 34.

Another embodiment of an edge light 14 is shown in FIG. 8. The elongate portion 33 has a plurality of horizontally spaced, vertical scratches 74 formed in the front surface 34. The shaped rear surface 35 may have any of the configurations of the previously described embodiments. Light radiated by the lamps 47 is reflected through the optical guide 32. The vertical scratches 74 scatter the light to provide a more uniform light distribution across the front surface 34 of the edge light 14.

In each of the previously described embodiments, the edge light 14 has a lamp 47 supported in each end portion 44 and 45 of the optical guide 32. However, as shown in FIG. 9 one of the lamps 47 may be omitted if desired. For example, using only one lamp 47 may be suitable when the edge light 14 is used with a narrow lighting panel 13 or when a low intensity light source is required. Reflector 56 enhances the efficiency of the lamp 47 by reflecting light back into the optical guide 32 where it is reflected within the guide as previously described until it is eventually extracted from the front surface 34.

FIG. 10 shows another embodiment of the invention in which the reflector 54 covers the planar surface 34 and the shaped surface 35 is positioned adjacent the end 19 of the lighting panel 13. The light reflected by the facets 39 through the planar surface 34 strikes the reflector 54 and is specularly reflected back into the optical guide 32 and through the shaped surface 35, as indicated. Although the shaped surface 35 has the configuration shown in FIG. 7, it should be understood that the shaped surface 35 may have any of the configurations of the previous embodiments.

Except as set forth above, the construction of the embodiments in FIGS. 5–10 are identical to that of FIGS. 1–4, and like reference numerals have been applied to like parts.

As is apparent from the foregoing discussion, the edge light 14 of the invention provides a light source with a uniform light distribution. The edge light 14 requires only one or two lamps, minimizing the number of light sources required to illuminate the lighting panel 13. The edge light 14 of the invention may be used to illuminate any suitable lighting panel. Moreover, as mentioned above the shaped major surface 18 of the lighting panel 13 may have other configurations. For example, the shaped major surface 18 of the lighting panel 13 may be provided with any of the shaped surfaces 35 described in relation to embodiments of the edge light 14 shown in the Figures.

What is claimed is:

1. An edge light for projecting light into a lighting panel through an end surface of said lighting panel, said edge light comprising:

a thin transparent optical guide member having an elongate portion and at least one end portion extending from said elongate portion, said elongate portion having a planar surface and a shaped surface parallel to said planar surface, said shaped surface being configured to selectively extract light striking said shaped surface from said guide member through one of said planar surface and said shaped surface and transmit light striking said shaped surface along said light guide to provide a substantially uniform distribution of light across said one of said planar surface and said shaped surface of said elongate portion, said end portion having flared surfaces inclined outwardly relative to said planar surface and said shaped surface and an opening formed therein, a light source positioned in said opening of said end portion for projecting light into said elongate portion of said guide member, said shaped surface including a plurality of transversely extending first and second facets formed therein, said first facets facing said end portion and said second facets facing away from said end portion, said shaped surface including a plurality of transversely extending grooves defined by adjacent ones of said first facets and said second facets and a plurality of planar portions extending between said grooves for reflecting light within said guide member along said elongate portion, said first facets being oriented at an angle relative to a plane substantially parallel to said shaped surface to transmit substantially all the light striking said first facets through said first facets and across said grooves toward the adjacent one of said second facets, said second facets being oriented at an angle relative to a plane substantially parallel to said shaped surface to reflect the transmitted light striking said second facet away from said shaped surface.

2. The edge light of claim 1 which further comprises a second end portion extending from said elongate portion opposite said at least one end portion, said second end portion having flared surfaces inclined outwardly relative to said planar surface and said shaped surface and an opening formed therein, and a second light source positioned in said opening of said second end portion for projecting light into said elongate portion of said guide member.

3. The edge light of claim 1 in which said light source is an optical fiber which transmits light from a remote light source and emits light into said optical guide.

4. An edge light for projecting light into a lighting panel through an end surface of said lighting panel, said edge light comprising:
- a thin transparent optical guide member having an elongate portion and at least one end portion extending from said elongate portion, said elongate portion having a planar surface and a shaped surface parallel to said planar surface, said shaped surface being configured for reflecting light within said guide member through one of said planar surface and said shaped surface, said end portion having flared surfaces inclined outwardly relative to said planar surface and said shaped surface and an opening formed therein, and
- a light source positioned in said opening of said end portion for projecting light into said elongate portion of said guide member, and
- a resilient material filling said opening around said light source and coupling said light source to said end portion.

5. The edge light of claim 4 in which said resilient material is tinted to provide colored light.

6. The edge light of claim 1 in which at least one of said flared surfaces is inclined at an angle of 15° to 30° relative to the one of said planar surface and said shaped surface joined to said at least one of said flared surfaces.

7. The edge light of claim 1 in which said elongate portion has an upper surface and a lower surface joining said planar surface and said shaped surface, and which further comprises a reflector adjacent each of said shaped surface, said upper surface, and said lower surface for reflecting light back into said guide member.

8. The edge light of claim 1 in which said facets are inclined at an angle of 45° to 67.5° relative to a plane substantially parallel to said shaped surface for reflecting light through said shaped surface.

9. The edge light of claim 8 which further comprises a reflector adjacent said shaped surface for reflecting the emitted light back into said guide member and through said planar surface.

10. An edge light for projecting light into a lighting panel through an end surface of said lighting panel, said edge light comprising:
- a thin transparent optical guide member having an elongate portion and at least one end portion extending from said elongate portion, said elongate portion having a planar surface and a shaped surface parallel to said planar surface, said shaped surface being configured to selectively extract light striking said shaped surface from said guide member through one of said planar surface and said shaped surface and transmit light striking said shaped surface along said light guide to provide a substantially uniform distribution of light across said one of said planar surface and said shaped surface of said elongate portion, said end portion having flared surfaces inclined outwardly relative to said planar surface and said shaped surface and an opening formed therein,
- a light source positioned in said opening of said end portion for projecting light into said elongate portion of said guide member,
- said shaped surface including a plurality of first facets facing said end portion and inclined at an angle for reflecting light through said planar surface of said elongate portion and a plurality of second facets joining adjacent ones of said first facets for transmitting light along said elongate portion.

11. The edge light of claim 10 which further comprises a second end portion extending from said elongate portion opposite said at least one end portion, said second end portion having flared surfaces inclined outwardly relative to said planar surface and said shaped surface and an opening formed therein, and a second light source positioned in said opening of said second end portion for projecting light into said elongate portion of said guide member.

12. The edge light of claim 10 in which said light source is an optical fiber which transmits light from a remote light source and emits light into said optical guide.

13. The edge light of claim 10 in which at least one of said flared surfaces inclined at an angle of 15° to 30° relative to the one of said planar surface and said shaped surface joined to said at least one of said flared surfaces.

14. The edge light of claim 10 in which said elongate portion has an upper surface and a lower surface joining said planar surface and said shaped surface, and which further comprises a reflector adjacent each of said shaped surface, said upper surface, and said lower surface for reflecting light back into said guide member.

15. The edge light of claim 10 in which said first facets are oriented at an angle of 35° to 45° relative to a plane substantially parallel to said shaped surface.

16. An edge light for projecting light into a lighting panel through an end surface of said lighting panel, said edge light comprising:
- a thin transparent optical guide member having an elongate portion and at least one end portion extending from said elongate portion, said elongate portion having a planar surface and a shaped surface parallel to said planar surface, said shaped surface being configured to selectively extract light striking said shaped surface from said guide member through one of said planar surface and said shaped surface and transmit light striking said shaped surface along said light guide to provide a substantially uniform distribution of light across said one of said planar surface and said shaped surface of said elongate portion, said end portion having flared surfaces inclined outwardly relative to said planar surface and said shaped surface and an opening formed therein,
- a light source positioned in said opening of said end portion for projecting light into said elongate portion of said guide member,
- said shaped surface including a plurality of transversely extending first and second facets formed therein, said first facets facing said end portion and said second facets facing away from said end portion, said shaped surface including a plurality of transversely extending grooves defined by adjacent ones of said first facets and said second facets and a plurality of planar portions extending between said grooves for reflecting light within said guide member along said elongate portion, said facets being oriented at an angle relative to a plane substantially parallel to said shaped surface to internally reflect substantially all the light striking said facets toward said planar surface at a first angle of incidence for emission from said planar surface, said planar portions being configured for internally reflecting a substantial portion of light striking said planar portion toward said planar surface at a second angle of incidence for internal reflection by said planar surface along said guide member.

17. The edge light of claim 16 which further comprises a second end portion extending from said elongate portion opposite said at least one end portion, said second end portion having flared surfaces inclined outwardly relative to said planar surface and said shaped surface and an opening formed therein, and a second light source positioned in said opening of said second end portion for projecting light into said elongate portion of said guide member.

18. The edge light of claim 16 in which said light source is an optical fiber which transmits light from a remote light source and emits light into said optical guide.

19. The edge light of claim 16 in which at least one of said flared surfaces is inclined at an angle of 15° to 30° relative to the one of said planar surface and said shaped surface joined to said at least one of said flared surfaces.

20. The edge light of claim 16 in which said elongate portion has an upper surface and a lower surface joining said planar surface and said shaped surface, and which further comprises a reflector adjacent each of said shaped surface, said upper surface, and said lower surface for reflecting light back into said guide member.

21. The edge light of claim 16 in which said facets are inclined at an angle of 35° to 45° relative to the plane defined by said shaped surface for reflecting light through said planar surface of said elongate portion.

22. An edge light for projecting light into a lighting panel through an end surface of said lighting panel, said edge light comprising:

a thin transparent optical guide member having an elongate portion and at least one end portion extending from said elongate portion, said elongate portion having a planar surface and a shaped surface parallel to said planar surface, said shaped surface being configured to selectively extract light striking said shaped surface from said guide member through one of said planar surface and said shaped surface and transmit light striking said shaped surface along said light guide to provide a substantially uniform distribution of light across said one of said planar surface and said shaped surface of said elongate portion, said end portion having flared surfaces inclined outwardly relative to said planar surface and said shaped surface and an opening formed therein, a light source positioned in said opening of said end portion for projecting light into said elongate portion of said guide member, said shaped surface including a plurality of first facets facing said end portion and inclined at an angle of 1° to 15° relative to a plane defined by said shaped surface for reflecting light along said light guide and a plurality of second facets facing away from said end portion and inclined at an angle of 35° to 55° relative to the plane defined by said shaped surface for reflecting light through said planar surface of said elongate portion.

23. The edge light of claim 22 which further comprises a second end portion extending from said elongate portion opposite said at least one end portion, said second end portion having flared surfaces inclined outwardly relative to said planar surface and said shaped surface and an opening formed therein, and a second light source positioned in said opening of said second end portion for projecting light into said elongate portion of said guide member.

24. The edge light of claim 22 in which said light source is an optical fiber which transmits light from a remote light source and emits light into said optical guide.

25. The edge light of claim 22 in which at least one of said flared surfaces is inclined at an angle of 15° to 30° relative to the one of said planar surface and said shaped surface joined to said at least one of said flared surfaces.

26. The edge light of claim 22 in which said elongate portion has an upper surface and a lower surface joining said planar surface and said shaped surface, and which further comprises a reflector adjacent each of said shaped surface, said upper surface, and said lower surface for reflecting light back into said guide member.

* * * * *